(12) United States Patent
Williams (10) Patent No.: US 7,331,597 B2
(45) Date of Patent: Feb. 19, 2008

(54) OVERHEAD PASSENGER AIRBAG

(75) Inventor: Jeffrey Daniel Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 406 days.

(21) Appl. No.: 10/668,719

(22) Filed: Sep. 23, 2003

(65) Prior Publication Data

US 2005/0062262 A1   Mar. 24, 2005

(51) Int. Cl.
*B60R 21/16*   (2006.01)
*B60R 21/26*   (2006.01)

(52) U.S. Cl. ............... 280/728.2; 280/729; 280/730.1; 280/742; 280/743.1

(58) Field of Classification Search .......... 280/730.1, 280/728.2, 729, 743.1, 742
See application file for complete search history.

(56) References Cited

U.S. PATENT DOCUMENTS

| 5,062,664 | A | | 11/1991 | Bishop et al. |
|---|---|---|---|---|
| 5,366,241 | A | | 11/1994 | Kithil |
| 5,599,042 | A | | 2/1997 | Shyr et al. |
| 5,602,734 | A | | 2/1997 | Kithil |
| 5,613,704 | A | * | 3/1997 | White et al. ............... 280/740 |
| 5,632,506 | A | * | 5/1997 | Shellabarger ............ 280/743.1 |
| 5,687,987 | A | * | 11/1997 | Spencer et al. ........... 280/728.2 |
| 5,826,904 | A | | 10/1998 | Ellis et al. |
| 5,833,266 | A | | 11/1998 | Bartoldus et al. |
| 5,951,038 | A | * | 9/1999 | Taguchi et al. .............. 280/729 |
| 6,283,500 | B1 | * | 9/2001 | Eckert et al. ............ 280/730.1 |
| 6,394,486 | B1 | * | 5/2002 | Fujimura et al. ........ 280/728.2 |
| 6,588,793 | B2 | * | 7/2003 | Rose ....................... 280/728.2 |

FOREIGN PATENT DOCUMENTS

| DE | 198 60 933 | 7/2000 |
|---|---|---|
| JP | 7-117605 | 5/1995 |

* cited by examiner

*Primary Examiner*—Eric Culbreth
(74) *Attorney, Agent, or Firm*—Sally J Brown; Madson & Austin (57) ABSTRACT

The application provides an overhead passenger airbag module for use in vehicles. The overhead passenger airbag module has a clamshell inflator housing configured to retain an airbag inflator. The inflator housing is also constructed to allow attachment of an airbag cushion to the airbag module. The overhead passenger airbag module also includes an airbag cushion having an airbag throat portion and a cushion portion. The invention also provides a method of folding the airbag cushions of the invention to aid proper deployment and help assure proper support and deceleration of a vehicle occupant during a collision event.

25 Claims, 5 Drawing Sheets

OVERHEAD PASSENGER AIRBAG

BACKGROUND OF THE INVENTION

1. Field of the Invention

The present invention relates to methods and patterns for folding airbag cushions. More specifically, the present invention relates to methods and patterns for folding airbag cushions used in overhead-mounted vehicular airbag modules.

2. Description of Related Art

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury to the occupant caused by contact with the vehicle's interior.

Many typical airbag systems consist of several individual components joined to form an operational module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, roof compartment, or other space in a vehicle. The airbag inflator is in fluid communication with the airbag cushion, and is configured to produce a gas to inflate the cushion when it is needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies, including pyrotechnic compounds and pressurized gas, to produce a volume of an inflation gas. The inflation gas is channeled into the airbag, inflating it. Inflation of the airbag causes it to deploy, placing it in position to receive the impact of a vehicle occupant. After contact of the occupant with the airbag and the corresponding deceleration of the occupant, the airbag rapidly deflates. To accomplish this, the inflation gas is vented from openings in the airbag, deflating it and freeing the occupant to exit the vehicle.

As experience in the manufacture and use of airbags has increased, the engineering challenges involved in their design, construction, and use have become better understood. Most airbag systems are designed to rapidly inflate and provide a cushion in proximity to a vehicle occupant. Many such cushions are configured to be placed in front of a vehicle occupant. Placement of the cushions is determined based on presumptions made of the position of a vehicle occupant during normal operation of the vehicle. Thus, a vehicle occupant enjoys optimal protection from a specific airbag when the occupant is in the presumed range of positions when the airbag deploys.

In some situations, injuries have been noted to occur when the occupant is "out of position" with regard to the presumed position discussed above. Injuries similar to out of position injuries may also result from improper deployment of the airbag. Improper deployment may result in either poor placement of the cushion when contacted by a vehicle occupant or incursion of the airbag cushion into the space reserved for the vehicle occupant. Such incursion during deployment may raise the probability of injury to the vehicle occupant.

Overhead airbag systems were developed as an alternative to frontally-placed airbag cushions. Such overhead cushions are advantageous in some situations since they deploy into position without exerting a force directly toward the vehicle occupant. In addition, positioning of the primary airbag in the roof of the vehicle when stored allows for greater design flexibility of the steering wheel and/or dashboard components of the vehicle.

One difficulty faced in the design and installation of overhead airbags is that the trajectory of deploying overhead airbags must be carefully controlled. One reason for this is that due to their placement in a vehicle, overhead airbags may encounter sun visors or other roof-mounted accessories during deployment. Such obstacles may deflect or trap an inflating airbag cushion, thus compromising the protection provided to the vehicle occupant. As a result, there is a need in the art for overhead airbag cushion designs which facilitate proper inflation of an airbag cushion.

In addition, because overhead airbag cushion modules are generally placed above vehicle occupants in vehicles, their rapid deployment downward into a vehicle cabin may place a vehicle occupant at risk of injury. This risk may be heightened when the vehicle occupant is out of the position anticipated for them in the vehicle by the vehicles' engineers. More specifically, in some situations, if airbags inflate rapidly and fully as they emerge from the roof, they may impinge into space reserved for the head and/or upper body of a vehicle occupant, thus creating a potential for injury. Thus, there is a need in the art for airbag modules and airbag cushion folding methods which guide proper deployment of the airbag cushion.

Accordingly, a need exists for methods of regulating the deployment trajectory of an overhead airbag cushion. More specifically, a need exists for novel inflator housings, overhead airbag designs, and folding patterns and methods for use with overhead airbag cushions and modules to improve overhead airbag performance. Such housings, airbag cushion designs, and novel folding patterns are provided herein.

SUMMARY OF THE INVENTION

The apparatus and method of the present invention have been developed in response to the present state of the art, and in particular, in response to the problems and needs in the art that have not yet been fully solved by currently available inflator housings, airbag modules, airbag cushions, and airbag cushion folding patterns and methods. Thus, the present invention provides novel inflator housings, airbag modules, airbag cushions, and airbag cushion folding patterns and methods.

In accordance with the invention as embodied and broadly described herein, a novel airbag module, an airbag inflator housing, an airbag cushion, and a related airbag cushion folding method are provided primarily for use in overhead airbag applications. The invention first provides an airbag module for protecting a vehicle occupant. In some embodiments, the airbag module of the invention may be configured to be used in the passenger side of a vehicle. The airbag module generally includes an airbag inflator, an airbag cushion, and a one-piece clamshell inflator housing. The airbag cushion of the invention generally includes a cushion throat and a cushion portion. The cushion portion may further include a center face, an inboard face, and an outboard face. Regions of the cushion described by the term "face" may be distinct panels of the airbag cushion, or alternatively, may simply be regions of the airbag oriented or positioned in a particular fashion.

The one-piece clamshell inflator housing of the invention includes an inflator sleeve for closeably receiving an airbag inflator and a diffuser sleeve for diffusing an inflation fluid produced by the airbag inflator as it enters an airbag cushion. More specifically, the inflator sleeve is shaped and constructed to close about an airbag inflator and to provide a diffuser for the final airbag module. The inflator housing may include fasteners, straps, welds, or other mechanical joints known in the art for maintaining the clamshell inflator housing in a closed position. The diffuser sleeve portion of the inflator housing may include elements on both sides of the clamshell housing, and thus may be configured for use by closing the clamshell inflator housing.

The inflator housing may additionally include cushion attachments for attaching an airbag cushion to the inflator housing. In some specific embodiments of the housing of the invention, the cushion attachments may be attachment pegs. In others, attachment means such as bolts, clamps, or adhesives may be used. In some embodiments of the invention, the airbag cushion may be attached directly about the inflator housing. This may result in the inflator housing being at least partially enclosed by the airbag cushion. The inflator housing and the cushion attachments may further be configured to allow attachment of the inflator or the completed airbag module to a vehicle.

The invention further provides an airbag cushion having a cushion throat used for transmission of inflation gas from the inflator into the cushion. The cushion throat of the airbag cushion includes a loop diffuser for diffusing a flow of inflation fluid produced by an airbag inflator as it enters the airbag cushion. This loop diffuser of the cushion throat may take the form of a secondary internal sleeve of the cushion throat having a closed end and at least one diffuser orifice for diffusing the inflation gas produced by an airbag inflator as it is transmitted into the airbag cushion. The secondary internal sleeve may be constructed of several individual panels or of a single panel joined to itself to form a tubular structure with a closed end and at least one diffuser orifice. The diffuser orifice may simply be an orifice of a variety of shapes, such as circular and oval, but which permits the passage of inflation fluid from the loop diffuser to the cushion portion of the airbag cushion.

In one embodiment, the internal sleeve of the loop diffuser has a windshield-facing panel and an occupant-facing panel, the panels being attached to form a closed sleeve having at least one diffuser orifice. The diffuser orifice may be positioned on either or both of the panels. The airbag cushion of the invention having the loop diffuser may be an overhead airbag cushion, or may be used elsewhere in a vehicle. More specifically, the airbag of the invention having a loop diffuser may be used in frontal airbags such as those installed in steering wheels/columns and dashboards, side-curtain airbags, thorax/pelvic airbags, and other airbags mounted in the roof, dashboard, or seats of a vehicle.

The airbag cushion of the invention may additionally be constructed to allow attachment of the cushion to an airbag inflator housing of the invention having cushion attachments. In some embodiments, this includes constructing the airbag cushion to include elements which securely attach to the cushion attachments of the inflator housing. Such elements may be simple, such as an eyelet for passing over an attachment peg. Alternatively, these attachment elements may utilize multiple attachment pegs or peg arrangements to aid in proper attachment and to provide a secure mount. Other more complex attachment means, including bolts, clamps, adhesives, etc., are within the knowledge of one of skill in the art, and are thus included within the scope of this invention.

The invention further provides a folding method for use with the airbag cushions of the invention. In some embodiments, the method includes the steps of providing an airbag cushion having an inboard face, an outboard face, and an inflation orifice; flattening the airbag cushion; tucking the inboard and outboard faces of the airbag cushion inwardly to produce at least one longitudinal pleat and a first folded end and a second folded end; drawing first and second folded ends of the airbag cushion produced in the previous steps toward each other to position them directly opposite the inflation orifice; rolling the first folded end of the airbag cushion toward the inflation orifice to produce a first roll fold; and rolling the second folded end of the airbag cushion toward the inflation orifice to produce a second roll fold, wherein the second roll fold encompasses the first roll fold. In some of the folding methods of the invention, the step of tucking the inboard and outboard faces of the airbag cushion inwardly to produce at least one longitudinal pleat is repeated to produce a plurality of longitudinal pleats. In specific methods, 3 longitudinal pleats are produced. Further, in some methods, the step of rolling the first folded end of the airbag cushion toward the inflation orifice comprises rolling the first folded end against either the windshield or occupant face of the airbag cushion.

In another folding method of the invention, a folding method for use with an overhead airbag module of the invention is provided. This method may include the steps of providing an airbag cushion having a center face, an inboard face, an outboard face, and a cushion throat with an inflation orifice; providing an inflator housing for receiving and retaining an airbag inflator, the inflator housing including at least one cushion attachment; attaching the cushion throat of the airbag cushion to the inflator housing; flattening the airbag cushion; tucking the inboard and outboard faces of the airbag cushion inwardly to produce at least one longitudinal pleat and a first folded end and a second folded end; drawing the first and second folded ends of the airbag cushion toward each other to position them directly opposite the airbag inflator; rolling a folded end of the airbag cushion toward the airbag inflator to produce a roll fold; and rolling the remaining folded end of the airbag cushion toward the airbag inflator to produce a roll fold, wherein the roll fold produced last encompasses the roll fold produced first.

In such folding methods, the step of attaching the cushion throat of the airbag cushion to the inflator housing may include at least partially encompassing the inflator housing with the cushion throat and attaching the cushion throat to the cushion attachment of the inflator housing. Further, as above, the step of tucking the inboard and outboard faces of the airbag cushion inwardly to produce at least one longitudinal pleat is repeated to produce a plurality of longitudinal pleats, in some methods producing 3 longitudinal pleats. In addition, the steps of rolling the ends of the airbag cushion toward the inflation orifice may comprise rolling them toward or away from the attachment flanges of the airbag cushion.

The patterns and methods of the invention may be specifically useful in overhead airbag applications. Alternatively, however, the patterns and methods of the invention may be useful in other airbag applications including, but not limited to side curtain airbags, frontally-mounted dashboard or steering wheel-mounted airbags, thorax airbags, and vehicle pillar airbags.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4H, is not intended to limit the scope of the invention, as claimed, but is merely representative of presently preferred embodiments of the invention.

The production of airbag systems capable of being stowed and deployed from the roof of a vehicle provides additional flexibility to vehicle designers and gives safety engineers another option for protecting vehicle occupants in specific vehicle designs. Although innovative and effective, overhead airbag systems also face difficulties in their design and implementation. More specifically, such systems often face constraints in the space available for them in a vehicle, as well as strict requirements for the deployment of the airbag cushion. Thus, the invention provides a novel airbag module having a novel inflator housing, airbag cushion, and airbag folding method suited for use in an overhead airbag application.

Figures 1A, 1B, 1C, 1D:
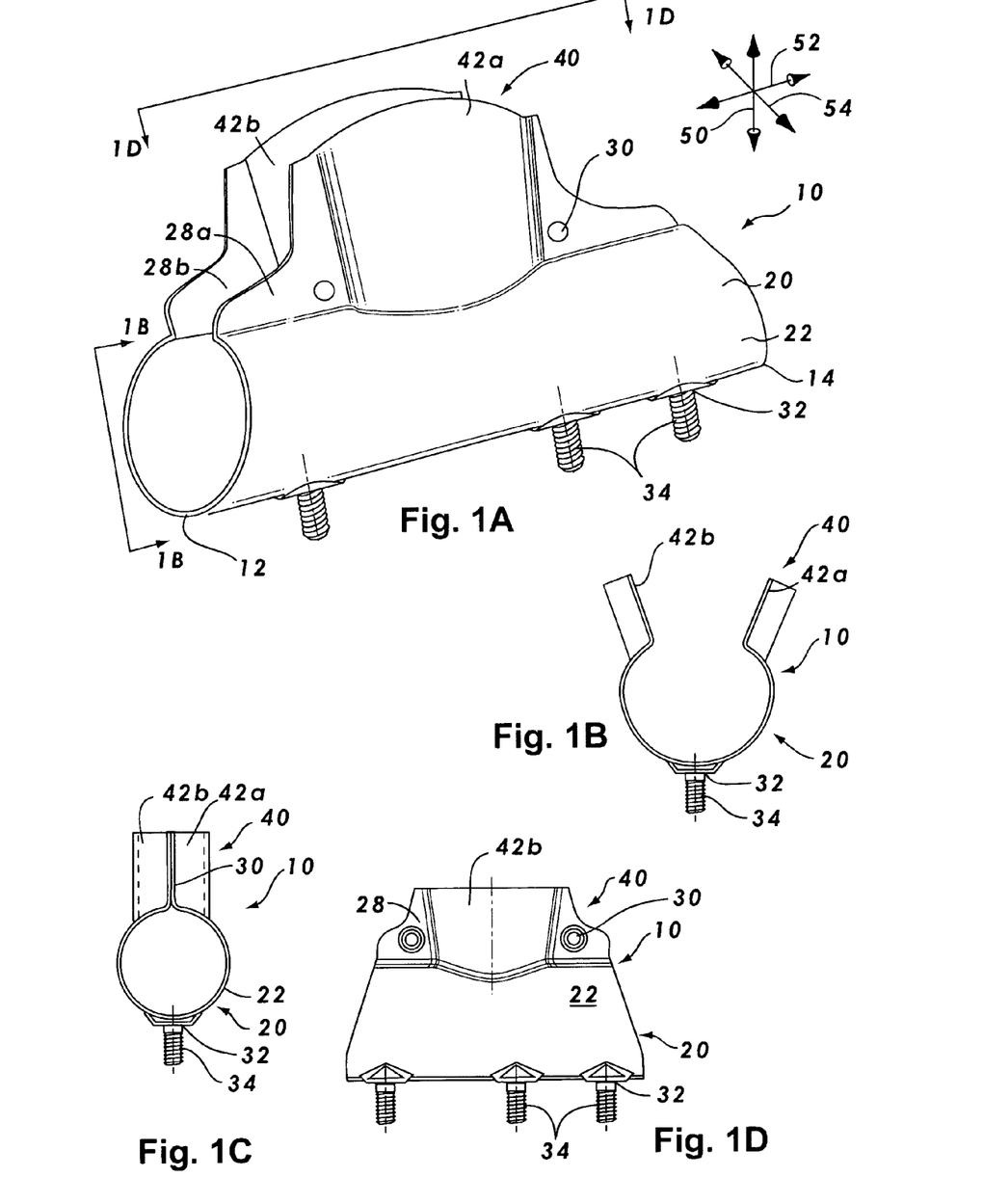
FIG. 1A is an isolated perspective view of a clamshell airbag inflator housing of the invention.
FIG. 1B is an end view of the inflator housing of FIG. 1A taken at line 1B-1B of FIG. 1A.
FIG. 1C illustrates the end view of the inflator housing of FIG. 1B in a closed configuration.
FIG. 1D is a longitudinal cross-sectional view of the inflator housing of FIG. 1A taken at line 1D-1D of FIG. 1A.

Referring first to FIG. 1A, an isolated perspective view of a clamshell airbag inflator housing 10 of the invention is shown. The inflator housing 10 includes an inflator sheath portion 20 and a diffuser sleeve 40. The inflator housing 10 is configured in size and shape to receive an airbag inflator and to be mounted to a vehicle. The clamshell inflator housing 10 may subsequently be fastened about the airbag inflator to securely hold the inflator in place. The inflator housing 10 additionally includes features which may be used in mounting an airbag cushion (not shown) to the housing 10 as part of an airbag module. In FIG. 1A, these features may include peg openings 32 in the inflator sheath 20 portion, and airbag mounting pegs 34 extending through the openings 32 in a transverse direction 50. The inflator housing 10 still further includes a diffuser sleeve 40 for diffusing a flow of inflation gas (not shown) as it exits an inflator and is directed into an airbag cushion.

The inflator sheath portion 20 is a generally tubular structure with a substantially tubular sheath wall 22 extending from a first end 12 of the inflator housing 10 to a second end 14 of the inflator housing 10 in a longitudinal direction 52. As briefly mentioned above, the inflator sheath 20 is produced to receive an airbag inflator. More specifically, the inflator sheath portion 20, or the inflator housing 10 as a whole, may be constructed of a material having sufficient flexibility and/or resilience to be opened to receive an inflator, and then later to be closed about the inflator to retain it in place.

In some embodiments, the inflator housing 10 may include pairs of closure flanges 28a, 28b which are placed on opposing walls 42a, 42b of the diffuser sleeve 40 to abut each other when the housing 10 is closed. Fastener openings 30 may be placed in the closure flanges 28a, 28b to keep the inflator sleeve closed. Alternatively, means such as welding, adhesives, clamps, or a large variety of fastening devices may be used to fasten the closure flanges 28a, 28b together. In some embodiments of the inflator housing 10 of the invention, closure flanges 28a, 28b may be crimped, folded, or otherwise mechanically linked to close the housing 10. In still other housings of the invention, closure flanges 28a, 28b are omitted, and the inflator sheath 20 and diffuser sleeve 40 are attached to each other directly. This may be accomplished using welding or other attachment measures known in the art. Alternatively, external attachment clamps or other means may be used.

The inflator sheath 20 is also shown to include peg openings 32 through which airbag cushion mounting pegs 34 extend outwardly from the inflator sheath 20. As shown in FIG. 1A, the openings 32 and the pegs 34 may be placed in an asymmetrical manner to assure proper orientation of an airbag cushion during assembly an airbag module. Such pegs 34 may attach to, or pass through portions of an airbag cushion (not shown) to attach the cushion to the inflator housing 10. In addition, pegs 34 may be used to attach the inflator housing 10 to a vehicle as part of a completed airbag module. Alternate airbag cushion attachment methods and mechanisms known in the art may be used, including clamps or other similar apparatus.

The diffuser sleeve 40 of the inflator housing 10 is also illustrated in FIG. 1A. The diffuser sleeve 40 projects outwardly from the inflator sheath 20 substantially in a transverse direction 50, which in FIGS. 1A through 1D is substantially perpendicular to the inflator sheath 20. Other angles may be used in varying circumstances to impart a desired direction to a flow of inflation gas produced by an inflator placed in the inflator housing 10. The diffuser sleeve 40 of FIGS. 1A-1D is shown to be slightly-funnel-shaped, and having a slightly flattened oval shape. One of skill in the art could vary the precise shape of the diffuser sleeve within the scope of the invention.

As briefly described above, the diffuser sleeve 40 is here shown to be formed from first and second sleeve walls 42a, 42b present on opposing sides of the substantially tubular wall 22 of the inflator sheath 20. When the inflator sheath 20 is closed, the first and second sleeve walls 42a, 42b are brought into contact, forming the funnel-shaped diffuser sleeve 40. As discussed above, this structure may be stabilized in a large variety of ways, including attaching closure flanges such as 28a, 28b together, or by directly attaching closure flanges 28a, 28b or the individual sleeve walls 42a, 42b. When an inflator has been installed in the inflator housing 10 of the invention, the outlet port protrudes from the inflator sheath 20 into the diffuser sleeve 40. When the inflator is initiated, the inflation gas produced is emitted into the diffuser sleeve 40, which directs it away from the inflator into an airbag cushion attached to the inflator housing 10.

Referring next to FIG. 1B, an end view of the inflator housing 10 of FIG. 1A is shown taken from line 1B-1B of FIG. 1A. As above, the inflator housing 10 includes an inflator sheath 20 and a diffuser sleeve 40. The inflator sheath 20 includes a sheath wall 22, here shown open to receive an airbag inflator. The diffuser sleeve 40 includes first and second sleeve walls 42a, 42b. The inflator sheath 20 is further shown to include peg openings 32, here in the form of slightly recessed wells which accommodate an airbag mounting peg 34, here shown to be a bolt with threads.

FIG. 1C shows the same end view of the inflator housing 10 of FIG. 1B taken from line 1B-1B of FIG. 1A, with the modification that the clamshell housing 10 has been closed by uniting diffuser sleeve walls 42a, 42b to form the completed diffuser sleeve 40. In this configuration, the inflator sheath 20 of the airbag housing 10 will retain an airbag inflator, and the diffuser sleeve 40 will diffuse and direct inflation gas produced by the airbag inflator.

FIG. 1D is a longitudinal cross-sectional view of the inflator housing of FIG. 1A taken at line 1D-1D of FIG. 1A. As in the previously-discussed Figures, the inflator housing 10 includes an inflator sheath 20 and a diffuser sleeve 40. The inflator sheath 20 is a tubular structure for accommodating an airbag inflator which further accommodates airbag cushion mounting pegs 34 which are passed through recessed peg openings 32. The diffuser sleeve 40 projects outwardly in a transverse direction 50 from the inflator sheath 20.

Figure 2:
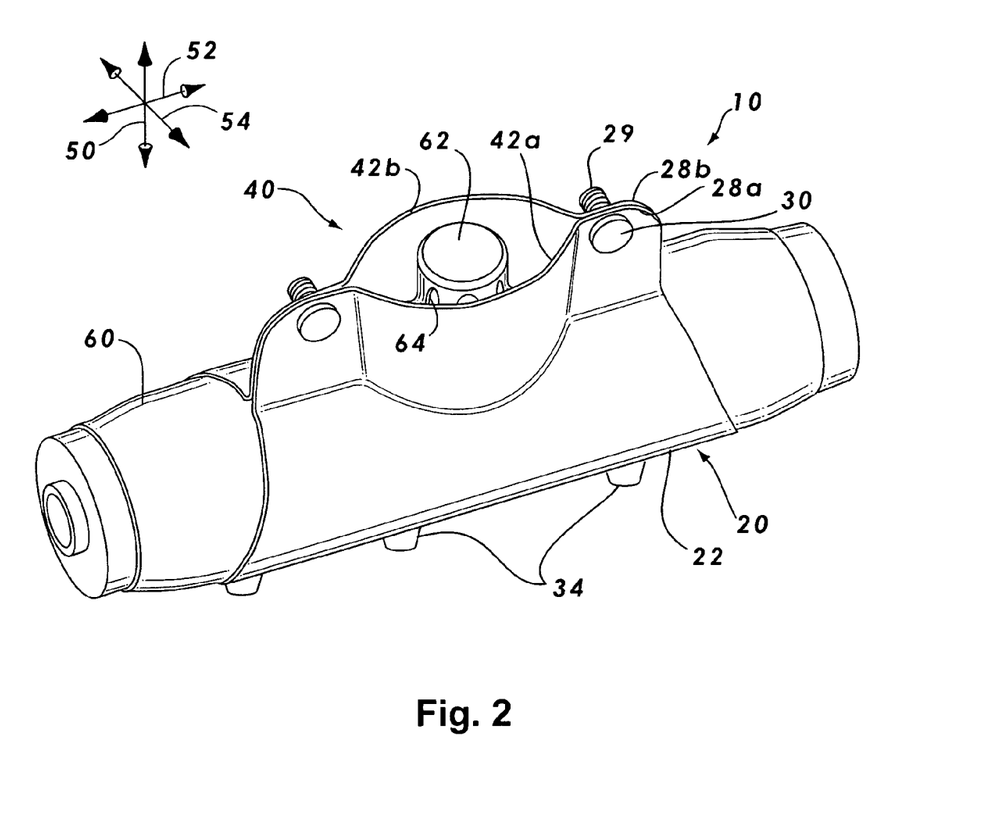
FIG. 2 shows an isolated perspective view of the inflator housing of the invention of FIGS. 1A-1D shown attached about an airbag inflator.

FIG. 2 shows a perspective view of the inflator housing 10 of FIGS. 1A-1D attached about an airbag inflator 60. As discussed above, the inflator housing 10 is shown to have received and been closed in a lateral direction 54 about an airbag inflator 60. Airbag cushion attachment pegs 34 extend from the housing 10. In this figure, the pegs 34 are shown to be simple pegs, not having screw threads, while in FIGS. 1A-1D, the pegs 34 are shown as bolts. One of skill in the art could vary the configuration of the pegs 34 to provide a secure attachment for an airbag cushion to the housing 10.

The outlet port 62 of the inflator 60 extends outwardly from the main body of the inflator 60 into the diffuser sleeve 40 of the inflator housing 10. The outlet port 62 is shown to include outlets 64 which permit an inflation gas to exit the inflator 60. In FIG. 2, the inflator housing 10 is shown to be held closed by fasteners 29 passing through the paired closure flanges 28a, 28b. In FIG. 2, a single fastener opening 30 is used, but one of skill in the art could vary the design to use multiple fastener openings 30 within the scope of the invention. In this manner, the sleeve walls 42a, 42b of the diffuser sleeve 40 are held in place, forming the shape of diffuser sleeve 40.

Figure 3:
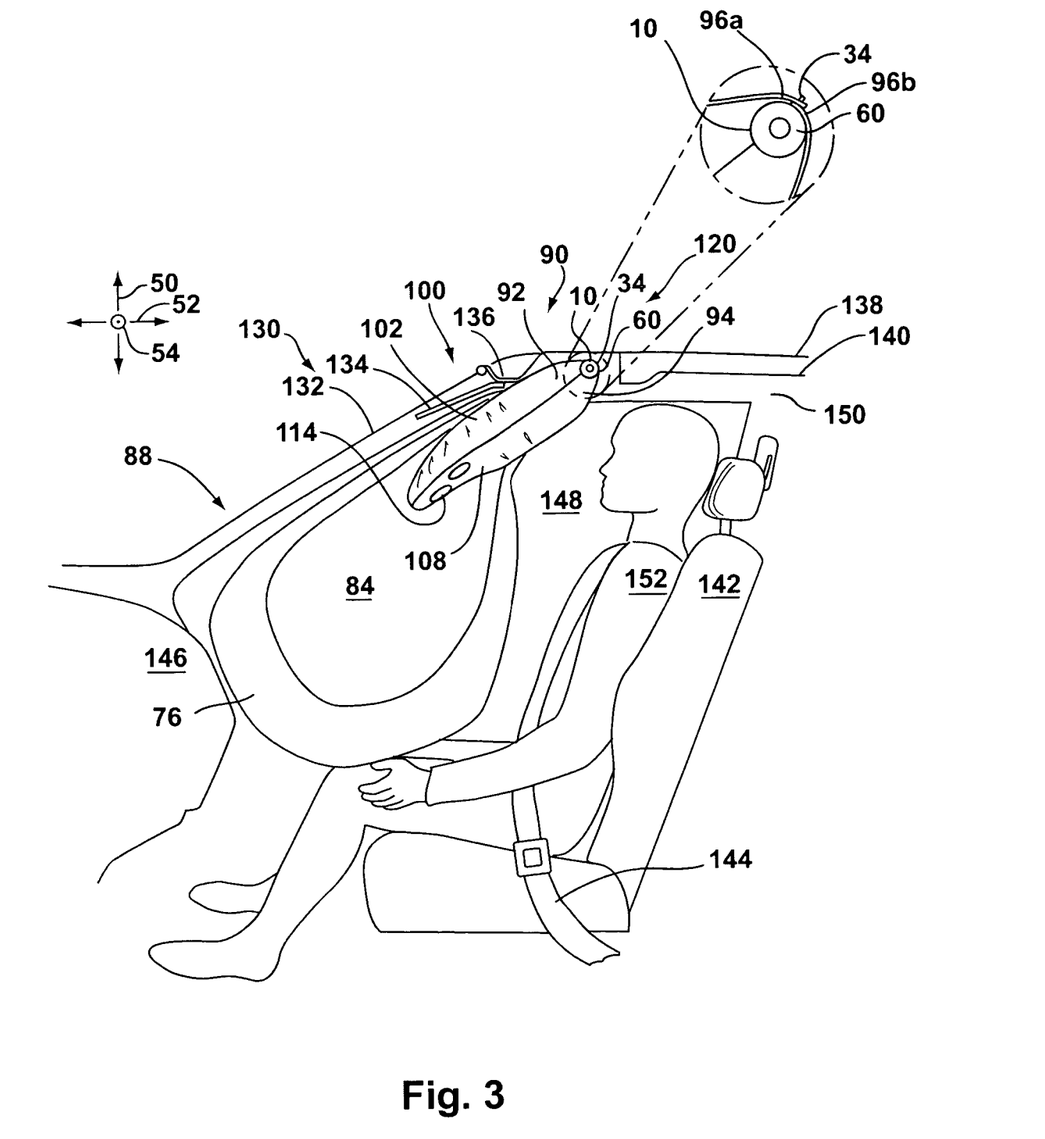
FIG. 3 shows a partial perspective view of a vehicle including an airbag module of the invention deployed and shown in a partial cross-sectional view to reveal the loop diffuser of the airbag cushion of the invention.

The invention of the instant application further provides an airbag cushion for use with the inflator housing of the invention. The airbag cushion may be configured for use as an overhead airbag positioned such that the cushion deploys from substantially above a vehicle occupant forward in a longitudinal direction 52, and downward in a transverse direction 50. The airbag cushions of the invention are configured to be attached to the inflator housings of the invention. FIG. 3 shows a partial perspective view of a vehicle 130 in which an airbag module 120 of the invention has been installed and deployed.

Referring next to FIG. 3, the airbag cushion 70 of the overhead airbag module 120 is depicted in a partial cross-sectional view, thus revealing a loop diffuser 100 of the airbag cushion 70 positioned internally to the cushion 70 to direct and diffuse a flow of inflation fluid produced by an airbag inflator 60. In FIG. 3, the overhead airbag module 120 is shown positioned in the passenger side of the vehicle 130. The invention may additionally be suited for use in a driver side of the vehicle 130 by one of ordinary skill in the art. In the vehicle 130 shown in FIG. 3, a vehicle occupant 152 is presented secured to a seat 142 by a seat belt 144, and surrounded by a side door 150 and window 148, a dashboard 146 and a windshield 132. In FIG. 3, the airbag module 120 is shown placed in the passenger side of the vehicle 130. As illustrated, the airbag module 120 is mounted in a roof 138 of a vehicle and covered by a headliner 140. A sun visor 134, held to the vehicle 130 by a visor mount 136 is located in front of the module 120 in a longitudinal direction 52.

The airbag module 120 is composed of an inflator housing 10, an airbag inflator 60, and an airbag cushion 70. The airbag cushion 70 is composed primarily of a cushion portion 88, a cushion throat 90, and a loop diffuser 100. The cushion portion 88 is generally composed of a looping center panel 76, an outboard panel 84, and an inboard panel 80 similar to the outboard panel 84 (shown removed for clarity). These panels 76, 80, 84 unite to form a spacious cushion 88 which may be sized to properly decelerate a vehicle occupant 152 in a specific space. The cushion portion 88 of the airbag cushion 70 is then attached to a cushion throat 90 which attaches the cushion 70 to the airbag inflator housing 10 and inflator 60 described above. In the embodiment of the cushion 70 shown in FIG. 3, the cushion throat 90 includes a top throat panel 92 and a bottom throat panel 94. As seen in the detail view of FIG. 3, the top throat panel 92 and the bottom throat panel 94 include attachment flaps 96a, 96b and loops 98. The loops 98 are passed over the attachment pegs 34 of the inflator housing 10, securing the airbag cushion 70 to the inflator housing 10.

The loop diffuser 100 may be constructed as a second layer within the cushion throat portion 90 of the cushion 70. In FIG. 3, the loop diffuser 100 includes a top diffuser panel 102, a bottom diffuser panel 108, and at least one diffuser outlet 114. The loop diffuser 100 rapidly inflates, and then serves to channel and direct a flow of inflation gas from the inflator 60 into the cushion portion 88 of the cushion 70. In some embodiments, as shown in FIG. 3, the inflation gas flows through at least one diffuser outlet 114. The number and positioning of the diffuser outlets 114 may be varied within the scope of the invention.

In one example of this, the loop diffuser 100 shown in FIG. 3 includes multiple diffuser outlets 114 to permit rapid transmission of inflation gas through the diffuser 100 into the cushion portion 88. Further, the diffuser outlets 114 of the airbag cushion 70 of FIG. 3 are shown clustered on the bottom diffuser panel 108. This directs the inflation gas downward into the cushion portion 88 of the airbag cushion 70. In other embodiments, it may be desirable to at least in part direct inflation gas in an upward fashion, in which case at least one diffuser outlet 114 could be placed in the top diffuser panel 102.

Figure 4A:
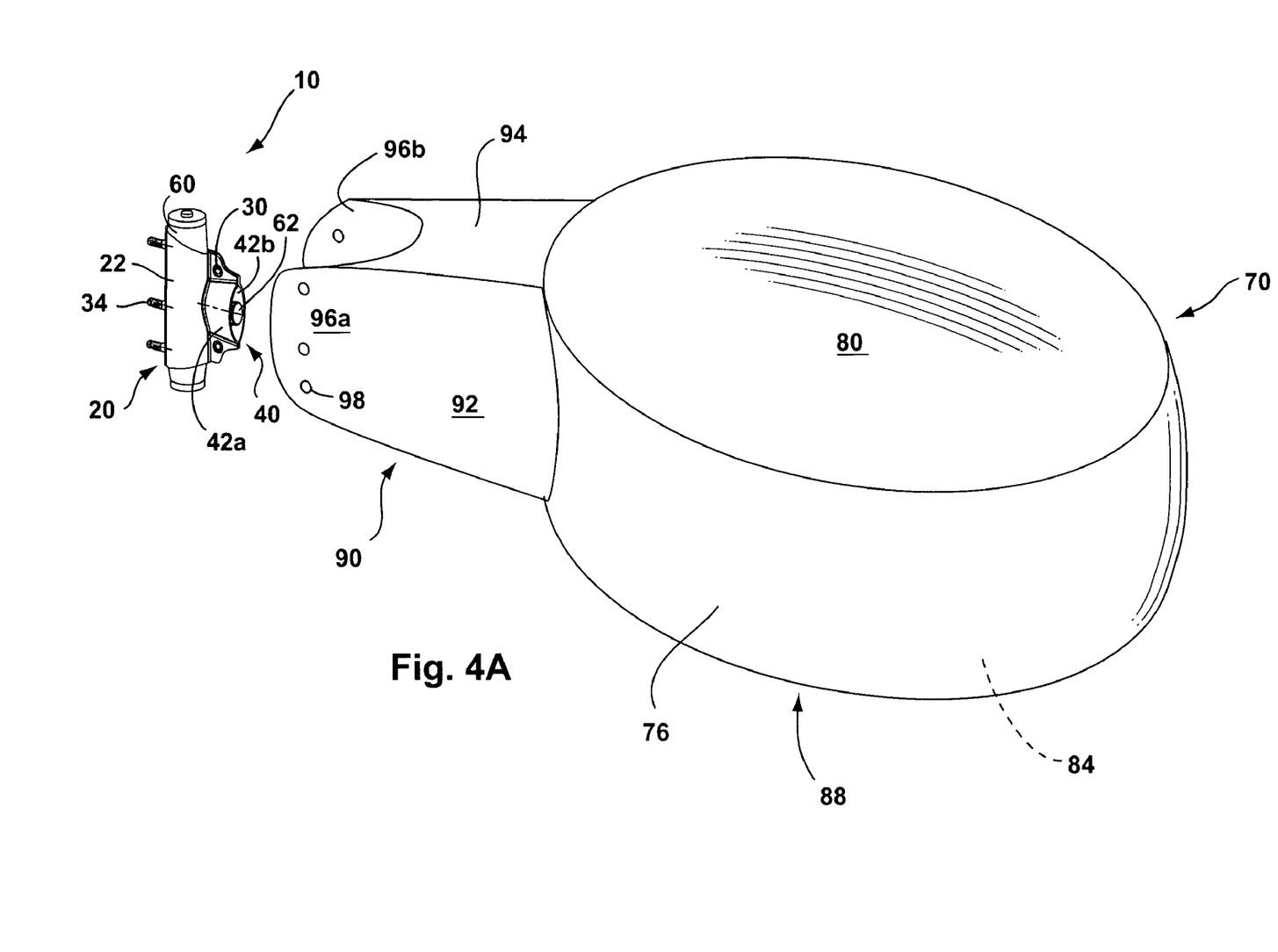
FIG. 4A shows a perspective view of an inflator housing of the invention aligned for attachment to an airbag cushion of the invention prior to cushion attachment, folding, and assembly to form an airbag module of the invention.

Referring next to FIGS. 4A through 4H, a method of assembling an airbag module including the inflator housing 10, airbag cushion 70, and a folding method of the invention are shown. FIG. 4A shows a first step of this folding and assembly method in which the inflator housing 10, enclosing an airbag inflator 60, is brought into alignment with the airbag cushion 70. More specifically, the inflator 60 is first placed into the housing 10, which is next closed securely about the inflator 60. Following this, the diffuser sleeve 40 of the inflator housing 10 may be inserted into the cushion throat 90 of the airbag cushion 70. The attachment flaps 96a, 96b of the top and bottom throat panels 92, 94 of the cushion throat 90 are then wrapped around the inflator housing 10. Loops 98 of the attachment flaps 96a, 96b are then placed over the pegs 34 of the inflator housing 10 to secure the airbag cushion 70 to the housing 10.

Figure 4B:
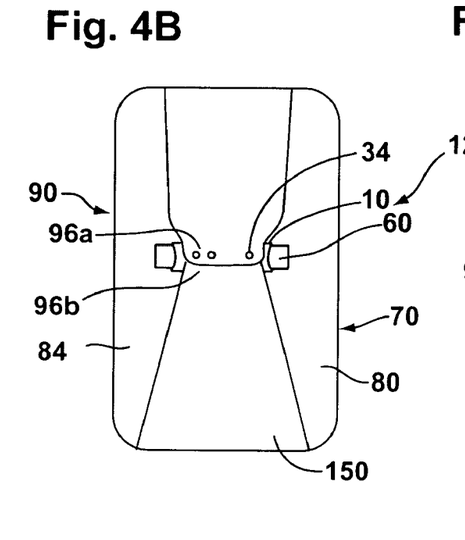
FIG. 4B illustrates initial steps of a method of attaching an airbag of the invention to an airbag housing of the invention and an initial step of a method of folding the airbag cushion to prepare an airbag module of the invention.

Referring next to FIG. 4B, a next step in the folding method of the invention is shown. More specifically, the airbag cushion 70 is substantially flattened, with the center panel 76 of the cushion 70 being substantially flattened against itself. In FIG. 4B, the inflator housing 10 is generally centered against the flattened cushion 70. In alternate embodiments of the folding method of the invention, the inflator housing 10 may be placed off-of-center to influence the deployment characteristics of the airbag cushion 70.

Figure 4C:
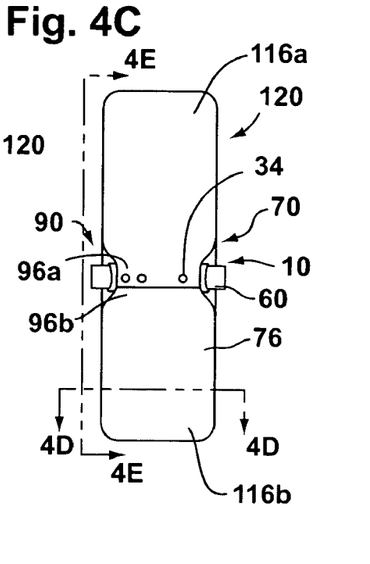
FIG. 4C shows a longitudinal pleat-folding step of the airbag cushion folding method of the invention.
Figure 4D:
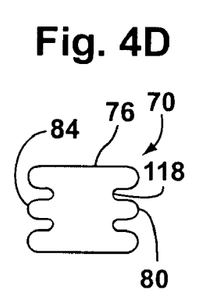
FIG. 4D shows a cross-sectional view of a portion of the longitudinally pleat-folded airbag cushion of FIG. 4C taken at line 4D-4D.

In a next step of the method illustrated in FIGS. 4C and 4D, the inboard and outboard panels 80, 84 of the airbag cushion 70 are tucked inwardly at least once to produce lateral tuck folds 118. In the folding method illustrated in FIGS. 4C and 4D, two lateral tuck folds 118 are produced. As shown in FIG. 4C, this narrows the airbag cushion 70 to approximately the width of the inflator 60. In addition, this step forms folded ends 116a, 116b of the airbag cushion 70. FIG. 4D is a view of the airbag cushion of FIG. 4C taken at line 4D-4D of FIG. 4C. The number and size of the lateral tuck folds 118 illustrated in FIG. 4D may be widely varied within the scope of the invention to accommodate airbags of varying sizes, desired module sizes, and other related issues.

Figures 4E, 4F:
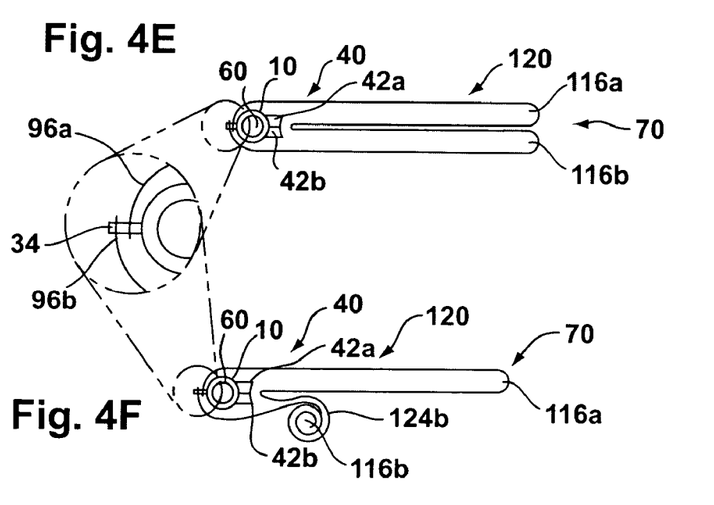
FIG. 4E shows a cross-sectional view of a the airbag cushion assembly of FIG. 4C taken at line 4E-4E prior to which the cushion ends had been placed together and drawn away from the inflator housing.
FIG. 4F shows a cross-sectional view of the airbag cushion of FIG. 4E having undergone an additional folding step.

Referring next to FIG. 4E, a next step of the method of the invention is shown in which the inflator housing 10 and inflator are drawn to one side, uniting first and second folded ends 116a, 116b. This step is illustrated in FIG. 4E with a side plan view of the airbag cushion 70 and inflator housing 10 taken from line 4E-4E of FIG. 4C. This step may be performed by drawing the folded ends 116a, 116b together and drawing the airbag inflator 60 and inflator housing 10 away from the folded ends 116a, 116b. This prepares the airbag cushion 70 for final folding to condense the body of the airbag cushion 70 and compact it such that it is small enough to be installed in a vehicle for potential use. The detail view shared between FIGS. 4E and 4F shows the projection of the attachment peg 34 from the inflator housing 10. The attachment flaps 96a, 96b extend and are attached about the pegs 34 to anchor the cushion 70 to the housing 10.

FIG. 4F shows the side plan view of the airbag cushion 70 and inflator housing 10 of FIG. 4E, taken from line 4E-4E of FIG. 4C, having undergone an additional folding step. In this additional folding step, one of the cushion ends 116a, 116b is rolled toward the inflator housing. In the embodiment of the folding method of the invention illustrated in FIG. 4F, the second folded end 116b is rolled toward the inflator 60 and inflator housing 10. This rolling step produces a roll fold 124b. In FIG. 4F, this roll fold 124b is oriented toward the attachment flaps 96a, 96b of the cushion throat 90 of the airbag cushion 70. In alternative embodiments of the folding method of the invention, the roll fold 124b could be produced such that it is oriented away from the attachment flaps 96a, 96b.

Figure 4G:
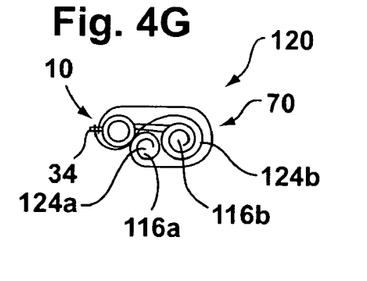
FIG. 4G shows a cross-sectional view of the airbag cushion of FIG. 4F having undergone a first roll-folding step.

Referring finally to FIG. 4G, a final step in this embodiment of the folding method is shown. More specifically, FIG. 4G shows the side plan view of the airbag cushion 70 and inflator housing 10 of FIG. 4E, taken from line 4E-4E of FIG. 4C, having undergone yet another folding step. In this added folding step, the first folded end 116a is also rolled toward the inflator housing 10, producing a roll fold 124a. In this step, the first folded end 116a is first rolled into a roll fold 124a, and is then rolled about the roll fold 124b. In the embodiment shown in FIG. 4G, the roll fold is produced with an orientation away from the attachment flaps 96a, 96b. In other embodiments of the invention, the roll fold 124a may be produced with an orientation toward the attachment flaps 96a, 96b. This step thus completes the primary folding steps of the folding method of the invention and substantially completes an airbag module 120.

Figure 4H:
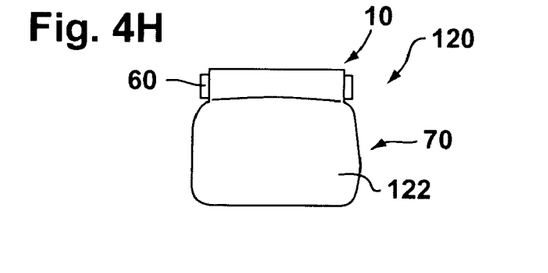
FIG. 4H shows a completed airbag module according to the invention.

In some embodiments of the invention, the airbag module 120 may additionally include an airbag module cover 122. The airbag module cover 122 may take several forms, including a pouch-like configuration, or a configuration in which the airbag cushion 70 is simply wrapped in cloth.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by U.S. Letters Patent is:

1. An airbag module for protecting a vehicle occupant comprising:
   an airbag inflator;
   an airbag cushion, the airbag cushion having a cushion throat, a windshield face, an occupant face, an inboard face, and an outboard face; and
   a one-piece clamshell inflator housing, the inflator housing comprising an inflator sleeve and a diffuser sleeve, the inflator sleeve being configured to receive and close about the airbag inflator, the diffuser sleeve formed from a first sleeve wall and a second sleeve wall that contact each other, wherein the first and second sleeve walls contact each other on the interior of the airbag cushion, wherein an outlet port of the airbag inflator extends into the diffuser sleeve such that the diffuser sleeve directs inflation gas produced by the inflator, wherein the diffuser sleeve is substantially transverse to the inflator sleeve.

2. The airbag module of claim 1, wherein the cushion throat of the airbag cushion comprises a loop diffuser.

3. The airbag module of claim 2, wherein the loop diffuser comprises a secondary internal sleeve of the cushion throat having at least one diffuser orifice.

4. The airbag module of claim 1, wherein the cushion throat of the airbag cushion is configured to be coupled to the inflator housing.

5. The airbag module of claim 1, wherein the inflator housing further comprises cushion attachments.

6. The airbag module of claim 5, wherein the cushion attachments are attachment pegs.

7. The airbag module of claim 1, wherein the diffuser sleeve is formed by closing the clamshell inflator housing.

8. The airbag module of claim 1, further comprising fasteners for maintaining the clamshell inflator housing in a closed position.

9. The airbag module of claim 1, wherein the airbag cushion is folded using a method comprising the steps of:
   flattening the windshield face and the occupant face of the airbag cushion;
   tucking the inboard and outboard faces of the airbag cushion inwardly to produce at least one longitudinal pleat and a first folded end and a second folded end;
   drawing the first and second folded ends of the airbag cushion toward each other to position them directly opposite the inflation orifice;
   rolling the first folded end of the airbag cushion toward the inflation orifice to produce a first roll fold; and
   rolling the second folded end of the airbag cushion toward the inflation orifice to produce a second roll fold, wherein the second roll fold encompasses the first roll fold.

10. An overhead airbag module for protecting a vehicle occupant comprising:
    an airbag inflator;
    an overhead airbag cushion, the airbag cushion having a cushion throat, a windshield face, an occupant face, an inboard face, and an outboard face; and
    a one-piece clamshell inflator housing, the inflator housing comprising an inflator sleeve and a diffuser sleeve, the inflator sleeve being configured to receive and close about the airbag inflator, the diffuser sleeve formed from a first sleeve wall and a second sleeve wall that contact each other, wherein the first and second sleeve walls contact each other on the interior of the airbag cushion, wherein an outlet port of the airbag inflator extends into the diffuser sleeve such that the diffuser sleeve directs inflation gas produced by the inflator, wherein the diffuser sleeve is substantially transverse to the inflator sleeve.

11. The overhead airbag module of claim 10, wherein the cushion throat of the overhead airbag cushion comprises a loop diffuser.

12. The overhead airbag module of claim 11, wherein the loop diffuser comprises a secondary internal sleeve of the cushion throat having at least one diffuser orifice.

13. The overhead airbag module of claim 10, wherein the cushion throat of the overhead airbag cushion is configured to be coupled to the inflator housing.

14. The overhead airbag module of claim 10, wherein the inflator housing further comprises cushion attachments.

15. The overhead airbag module of claim 14, wherein the cushion attachments are attachment pegs.

16. The overhead airbag module of claim 10, wherein the diffuser sleeve is formed by closing the clamshell inflator housing.

17. The overhead airbag module of claim 10, further comprising fasteners for maintaining the clamshell inflator housing in a closed position.

18. The overhead airbag module of claim 10, wherein the airbag cushion is folded using a method comprising the steps of:
    flattening the windshield face and the occupant face of the airbag cushion;
    tucking the inboard and outboard faces of the airbag cushion inwardly to produce at least one longitudinal pleat and a first folded end and a second folded end;
    drawing the first and second folded ends of the airbag cushion toward each other to position them directly opposite the inflation orifice;
    rolling the first folded end of the airbag cushion toward the inflation orifice to produce a first roll fold; and
    rolling the second folded end of the airbag cushion toward the inflation orifice to produce a second roll fold, wherein the second roll fold encompasses the first roll fold.

19. An airbag module comprising:
    an airbag cushion having a throat portion and a cushion portion, the throat portion further comprising a loop diffuser; and
    an inflator housing comprising an inflator sleeve and a diffuser sleeve, the diffuser sleeve formed from a first sleeve wall and a second sleeve wall that contact each other, wherein an outlet port of an airbag inflator extends into the diffuser sleeve such that the diffuser sleeve directs inflation gas produced by the inflator, wherein the first and second sleeve walls contact each other on the interior of the airbag cushion, wherein the diffuser sleeve is substantially transverse to the inflator sleeve.

20. The airbag module of claim 19, wherein the loop diffuser comprises an internal sleeve having at least one diffuser orifice to allow passage of an inflation gas between the throat portion and the cushion portion of the airbag cushion.

21. The airbag module of claim 20, wherein the internal sleeve of the loop diffuser has a windshield-facing panel and an occupant-facing panel, the panels being attached to form a closed sleeve.

22. The airbag module of claim 21, wherein the internal sleeve of the loop diffuser comprises at least one diffuser orifice on the occupant-facing panel.

23. The airbag module of claim 21, wherein the internal sleeve of the loop diffuser comprises at least one diffuser orifice on the windshield-facing panel.

24. The airbag module of claim 21, wherein the internal sleeve of the loop diffuser comprises at least one diffuser orifice on the occupant-facing panel and on the windshield-facing panel.

25. The airbag module of claim 19, wherein the airbag cushion is an overhead airbag cushion.

* * * * *